United States Patent [19]

Shirasagi et al.

[11] Patent Number: 5,388,660
[45] Date of Patent: * Feb. 14, 1995

[54] MOTOR BICYCLE

[75] Inventors: Sadao Shirasagi; Seishiro Kaneta, both of Hamamatsu, Japan

[73] Assignee: Suzuki Kabushiki Kaisha, Japan

[*] Notice: The portion of the term of this patent subsequent to Sep. 17, 2008 has been disclaimed.

[21] Appl. No.: 116,486

[22] Filed: Sep. 3, 1993

Related U.S. Application Data

[63] Continuation of Ser. No. 724,110, Jul. 1, 1991, abandoned, which is a continuation of Ser. No. 517,426, May 1, 1990, Pat. No. 5,048,634, which is a continuation of Ser. No. 221,928, Jul. 20, 1988, abandoned.

[30] Foreign Application Priority Data

Jul. 21, 1987 [JP] Japan ................. 62-180155

[51] Int. Cl.⁶ .............................................. B62J 9/00
[52] U.S. Cl. ..................................... 180/219; 280/835
[58] Field of Search ................. 180/219, 68.1, 68.3; 280/835

[56] References Cited

U.S. PATENT DOCUMENTS

| | | | |
|---|---|---|---|
| 3,926,274 | 12/1975 | Morioka et al. | 180/219 |
| 3,937,484 | 2/1976 | Morioka et al. | 180/219 |
| 3,944,009 | 3/1976 | Katagiri | 180/219 |
| 4,457,524 | 7/1984 | Yoshiwara | 280/835 |
| 4,723,620 | 2/1988 | Ono | 180/219 |
| 4,813,511 | 3/1989 | Yamaguchi et al. | 180/219 |
| 4,830,134 | 5/1989 | Hashimoto | 180/219 |
| 4,940,111 | 7/1990 | Nogami et al. | 180/219 |
| 5,048,634 | 9/1991 | Shirasagi et al. | 180/219 |

FOREIGN PATENT DOCUMENTS

| | | | |
|---|---|---|---|
| 2397315 | 3/1979 | France | 180/219 |
| 60-154964 | 8/1985 | Japan | |
| 61-282178 | 12/1986 | Japan | |

*Primary Examiner*—Mitchell J. Hill
*Attorney, Agent, or Firm*—Bruce L. Adams; Van C. Wilks

[57] ABSTRACT

A motor bicycle is provided with a main frame supporting a head tube operatively connected a steering shaft of a front wheel. The main frame includes a main tube which is connected to the head tube and extends rearwardly along the main body of the motor bicycle, and the main tube comprises two tube members extending rearwardly from the head tube with a certain angle in bilaterally oblique directions in a plan view. A helmet storage box is disposed in a space between the two tube members, the seat and the head tube so as to have an inner volume sufficient for accommodating a helmet or the like. This arrangement makes it possible to locate a fuel tank below the seat without changing the outer appearance of the motor bicycle.

9 Claims, 4 Drawing Sheets

MOTOR BICYCLE

This is a continuation of application Ser. No. 724,110, filed Jul. 1, 1991, now abandoned, which is a continuation of application Ser. No. 517,426, filed May 1, 1990, now U.S. Pat. No. 5,048,634, which is a continuation of application Ser. No. 221,928, filed Jul. 20, 1988, abandoned.

BACKGROUND OF THE INVENTION

This invention relates to a motor bicycle having an engine at a central lower portion thereof and having a space sufficient for locating a box-like member in which a helmet or the like can be stored.

A driver or rider who drives a motor bicycle usually wears a helmet on his head or is obliged to do so for security sake, and the helmet is usually left on or with the motor bicycle when he temporarily parks the motor bicycle. However, a conventional motor bicycle is not provided with any specific equipment for accommodating the helmet in a motor bicycle body, so that the rider or driver is obliged to bring the helmet with him or lock it to the motor bicycle when he leaves therefrom.

In a certain conventional technique, there is provided a motor scooter in which a stepped portion is arranged on a downwardly curved portion between a handle mechanism and a seat and a space sufficient for accommodating the helmet is defined at the lower portion of the seat by covering with an outer body with the seat as a cover for the space (for example, as disclosed in the Japanese Patent Laid-Open Publication Nos. 154964/1985 or 282178/1986).

However, with a usual type motor bicycle in which the engine is mounted at the lower portion of the motor bicycle body, since a ride-on type seat is utilized, it is difficult to design the lower portion of the seat to have a wide lateral width and also to provide a space below the seat because the wheels of the motor bicycle have relatively large diameters in comparison with those of the motor scooter. Thus, with the conventional motor bicycle having an engine disposed at the central lower portion of the body, it is difficult to ensure a space for accommodating the helmet below the seat or in another portion of the motor bicycle body. Accordingly, when the rider leaves the motor bicycle, the helmet is left, for example, by hanging it a portion of the motor bicycle body or he must carry the helmet with him to prevent the helmet from being robbed, thus being inconvenienced.

Japanese Utility Model Publication No. 3572/1988 discloses a motor bicycle provided with a box for accommodating a helmet between a head tube and a seat by downwardly bending a body frame. However, the downward bending of the body frame creates problems respecting the rigidity of the body frame and the manufacturing thereof, such as by a molding method. Moreover, when the motor bicycle is running, a driving stress is largely given to a portion joining the upper portion of the body frame and the head tube, and therefore, it is not desired to bend downwardly the body frame for bearing such driving stress.

Furthermore, in this connection, attention should be paid to the location of the other equipments of the motor bicycle or motorcycle. Particularly, attention should be paid to the fuel tank which may be formed in various shape because of its material.

SUMMARY OF THE INVENTION

An object of this invention is to substantially eliminate or overcome the defects or drawbacks in the conventional technique and to provide a motor bicycle having a space for accommodating a helmet or the like by rearranging a fuel tank, an air cleaner unit, or the like having a relatively large volume.

This and other objects can be achieved according to this invention in one aspect by by providing a two-wheeled motorized vehicle comprising:

a main frame having a biforked element comprised of two frame elements extending rearwardly and downwardly along the vehicle;

a steerable front wheel rotatably supported at a front part of the main frame;

a rear wheel rotatably supported at a rear part of the main frame;

an internal combustion engine carried by the main frame and connected to rotationally drive the rear wheel;

a storage compartment disposed above the engine in the space between the two rearwardly and downwardly extending frame elements and having a size and shape sufficient to stow therein a helmet for a rider; and a seat carried by the main frame and positioned rearwardly of the storage compartment.

In another aspect of this invention, there is provided a two-wheeled motorized vehicle comprising:

a main frame having a biforked element comprised of two frame elements extending rearwardly and downwardly along the vehicle;

a steerable front wheel rotatably supported at a front part of the main frame;

a rear wheel rotatably supported at a front part of the main frame;

an internal combustion engine carried by the main frame and connected to rotationally drive the rear wheel;

a storage compartment disposed above the engine in the space between the two rearwardly and downwardly extending frame elements and having a size and shape sufficient to store therein a helmet for a rider;

a seat carried by the main frame and positioned rearwardly of the storage box compartment; and a fuel tank disposed substantially below the seat and above the rear wheel so as to extend obliquely upwardly and rearwardly, the fuel tank having a front end portion extending towards a lower side of a rear portion of the storage compartment and being provided with a fuel port opened upwardly at a rear end portion of the fuel tank.

According to the construction of the motor bicycle of this invention, a helmet or the like can be accommodated in a lockable storage box located between handle levers and a seat, and a flat fuel tank is disposed below this arrangement. Accordingly, the outer appearance of the motor bicycle is not changed from that of a conventional motor bicycle. Since the helmet storage box can be constructed to be compact with a suitable inner space, a portion, such as a silencer, or an air clear unit, can be arranged between the seat and the storage box. The fuel tank has no limitation in shape and is guarded by the body, the seat and a rear fender, so that the fuel tank is formed or molded by a blow formation of a synthetic resin even in a relatively complicated shape, thus advantageously utilizing the space below the seat and the air cleaner unit.

The specific location of the fuel tank makes it possible to compact and improve the arrangement of other equipment of the motor bicycle.

The preferred embodiment of the motor bicycle equipped with improved helmet storage box and fuel tank according to this invention will be described hereunder further in detail with reference to the accompanying drawings.

DESCRIPTION OF THE PREFERRED EMBODIMENTS

Figure 1:
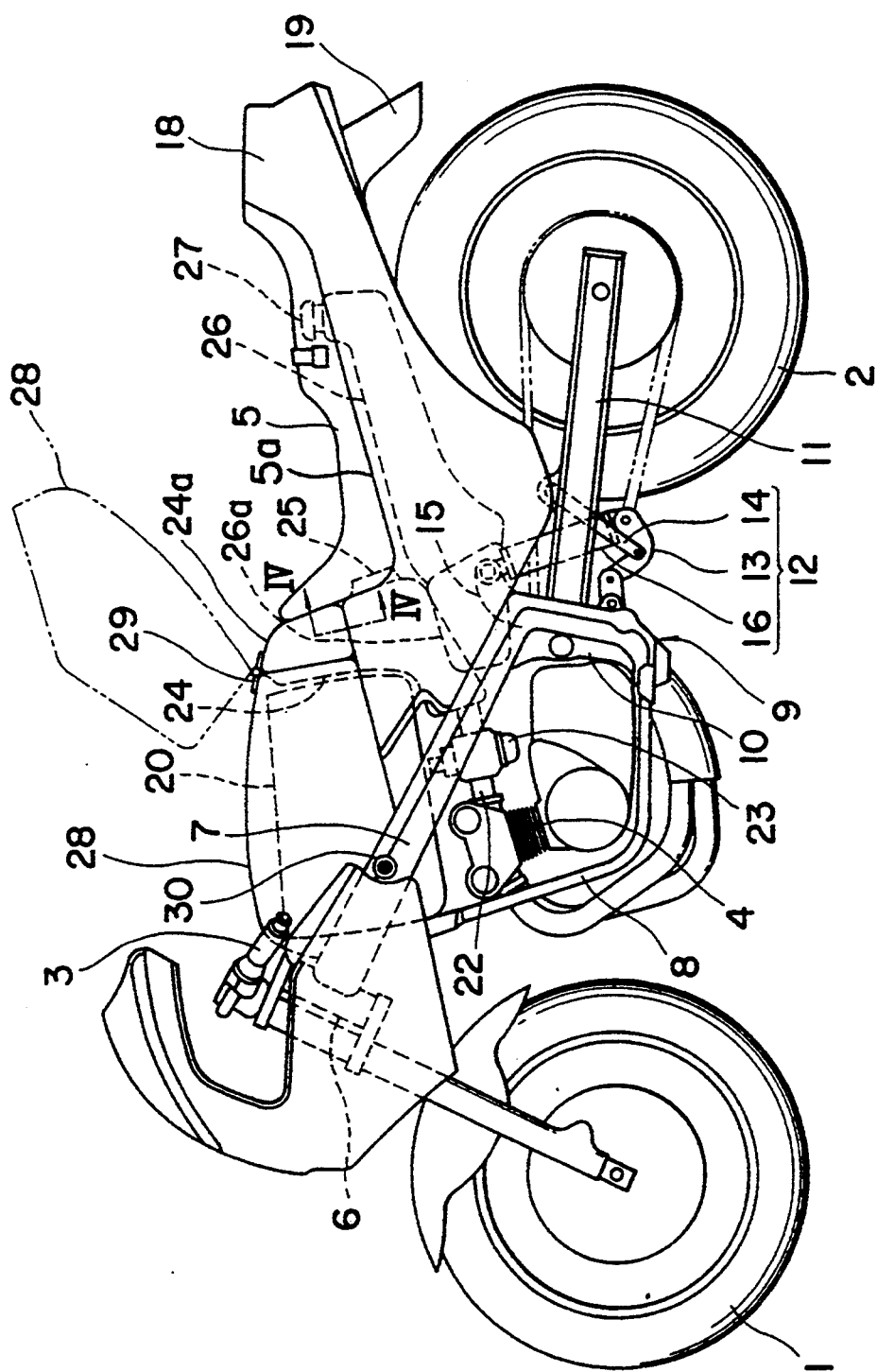
FIG. 1 is a side view of a motor bicycle according to this invention.

Referring to FIG. 1 showing a side view of a motor bicycle, motorcycle or two-wheeled motorized vehicle according to this invention, the motor bicycle includes a front wheel 1 steerable by handle levers 3, a rear wheel 2 driven by an internal combustion engine 4 incorporated in a central lower portion of a body of the motor bicycle, and a ride-on type seat 5 disposed at a rear upper portion of the body.

The engine 4 is accommodated in a main frame 9 which is constructed in substantially a trapezoidal shape by a biforked element 7 extending from a front portion of the body rearwardly and then curving downwardly and a down tube 8 also extending from the front portion of the body rearwardly downwardly and then curving rearwardly. A head tube 6 adapted to support a steering shaft for steering the front wheel 1 is supported at the front end of the thus constructed main frame 9.

The rear wheel 2 is supported through an axle at the rear end of a swing arm 11 pivoted swingably to a reinforcing member 10 disposed at the rear portion of the main frame 9, and the rear wheel 2 is also suspended by a mono-suspension mechanism 12 so as to snub or buffer the same. The mono-suspension mechanism 12 comprises a link 13 having a front end pivoted to a rear lower portion of the main frame 9 and extending rearwardly therefrom, a link 14 having one end connected at substantially the central portion of the first mentioned link 13 and the other end connected to a front portion of the swing arm 11, and a buffer unit 16 having one end connected to a bracket 15 secured to a rear upper portion of the main frame 9 and the other end connected to a rear end of the link 13.

A rear frame 17 (FIG. 2) is connected to the main frame 9 so as to rearwardly extend upwardly obliquely, the rear frame 17 being adapted to support the seat 5 and being covered by a rear cover 18, and a rear fender 19 is connected to the rear portion of the rear cover 18.

In the foregoing, although the various components or parts of the motor bicycle are described with reference to one side thereof, it will be easily understood that a substantially symmetrical arrangement is done on the other side of the motor bicycle.

Figure 3:
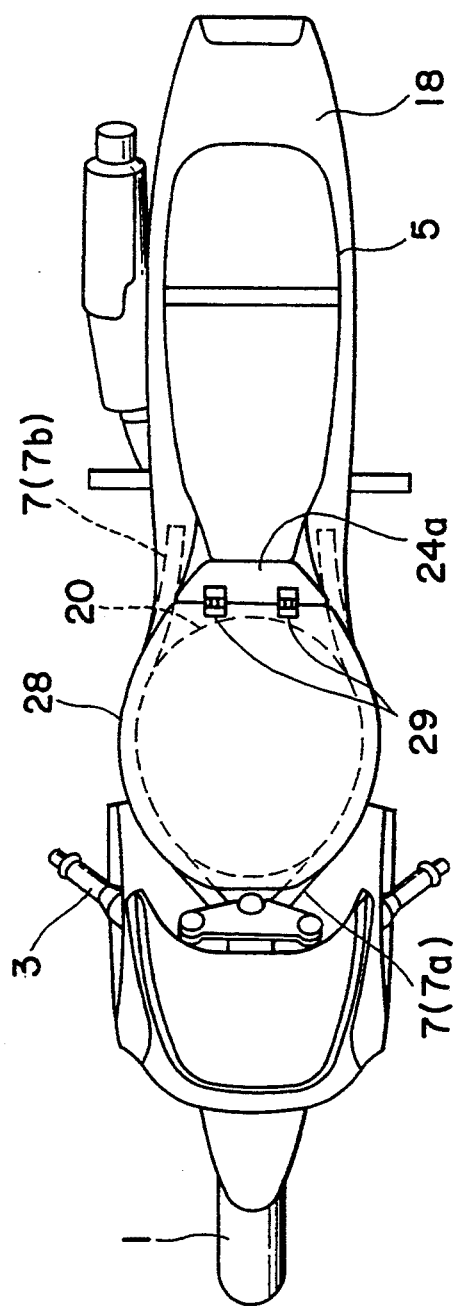
FIG. 3 is a plan view of the motor bicycle shown in FIG. 1 or 2.

The biforked element 7 comprises two members rearwardly extending from the head tube 6, and as shown in FIG. 3 by dotted lines, in a plan view, these two members 7a and 7b extend bilaterally obliquely at a certain angle therebetween so as to define a space therebetween to arrange a helmet storage compartment or storage box 20. The rear portions of these members 7a and 7b extend along the outer configuration of the storage box 20, for example, in a curved shape. Thus, the angle defined by the members 7a and 7b can be optionally determined as a matter of design. The storage box 20 is upwardly openable and has an inner space of sufficient size and space for accommodating a helmet 21 or the like and the space may be preferably designed so as to accommodate the largest type helmet therein.

An air cleaner case 24 is disposed at a rear lower portion of the storage box 20, the air cleaner case 24 being connected to an intake passage 22 of the engine 4 through a carburetor 23 and being provided with a silencing unit 24a extending upwardly along the rear surface of the storage box 20 and positioned adjacent to the seat 5. Air intake port 25 for the air cleaner case 24 is opened to the lower portion of the seat 5.

Figure 5:
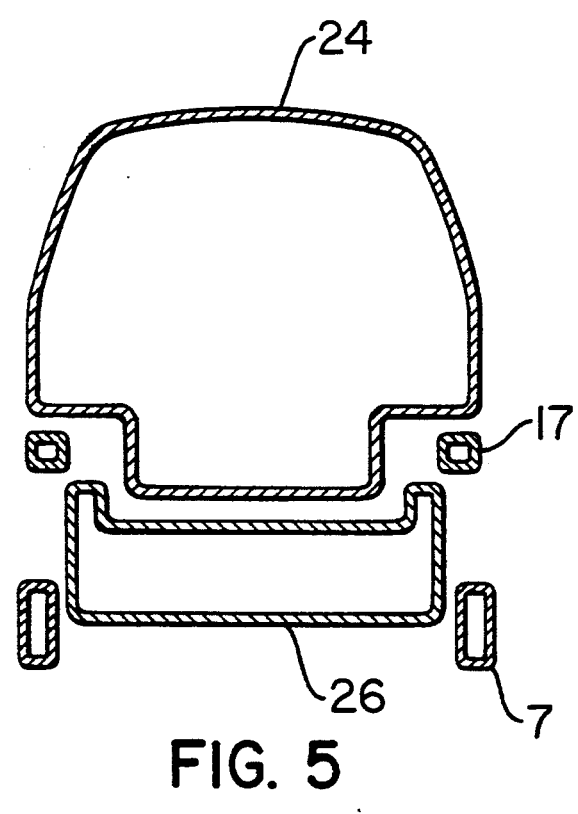
FIG. 5 is a cross section of a portion of the air cleaner, taken along the line V—V of FIG. 2.

A fuel tank 26 of flat type made of a synthetic resin having a front end portion 26a extending towards the lower side of the air cleaner case 24 is located below the seat 5 along the lower or bottom portion 5a of the seat 5. The fuel tank 26 is provided with a fuel port 27 opened upwardly at the rear end portion of the fuel tank 26, the fuel port 27, with a cap, being usually covered by the seat 5. The fuel port 27 with the cap may be directly exposed to the atmosphere at a portion rearward of the seat. The front end portion 26a of the fuel tank 26 is provided with a central cutout recessed portion, not shown, into which are arranged the lower edge portion of the air cleaner case 24, the mono-suspension 12 and the bracket 15. FIG. 5 is a cross-sectional view taken along the line V—V of FIG. 2 and shows the lower edge portion of the air cleaner case 24 arranged in the central recessed portion of the fuel tank 26. The rear cover 18 covers the two opposed sides of the fuel tank 26 so as to serve as a protecting plate and also covers both sides of the air cleaner case 24 with the extending front portion of the rear cover 18.

Figure 2:
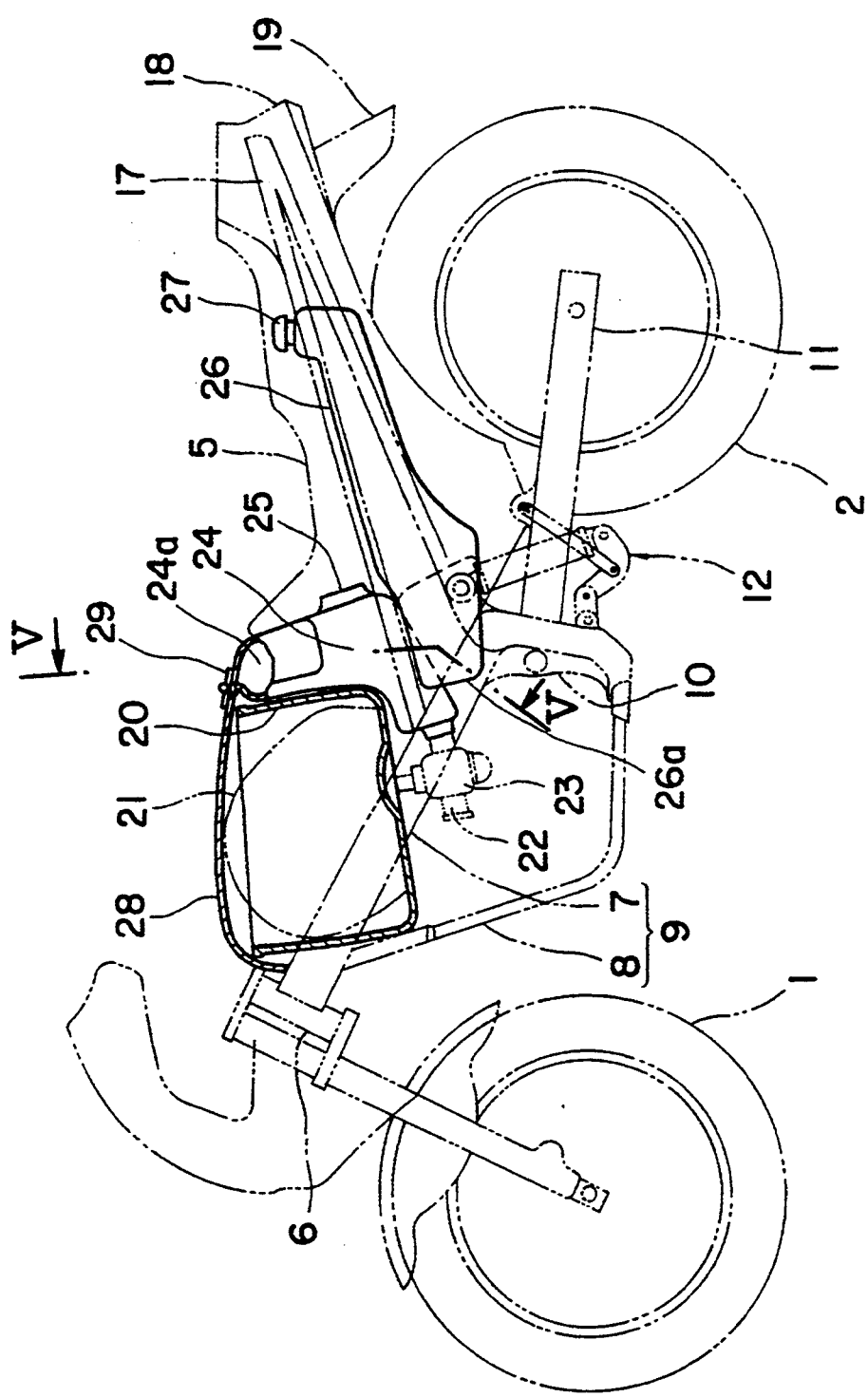
FIG. 2 is also a side view of the motor bicycle, with some parts in cross section and other parts in broken lines, showing an arrangement of a storage box for a helmet.
Figure 4:
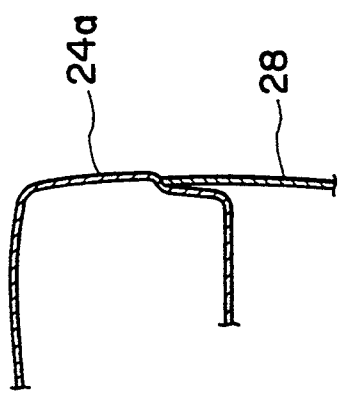
FIG. 4 is a cross section in an enlarged scale of a portion of an air cleaner of the motor bicycle, taken along the line IV—IV of FIG. 1.

The upper and both side surfaces of the storage box 20 can be covered by a cover or cover member 28 having a configuration suitable for accommodating a helmet therein. The cover 28 is provided with a rear end edge pivotably secured by hinge means to the upper surface of the silencer unit 24a of the air cleaner case 24 so that the cover can be pivoted in an upward direction to open the storage box 20 (FIG. 1) and pivoted in a downward direction to a closed position to close the storage box 20 (FIG. 2). The cover 28 can be locked by locking means 30 when the cover 28 is closed. The cover 28 is so designed that the opposite side portions of the cover 28 can form, when the cover 28 is closed, a smooth surface with substantially no stepped portion together with the side surface of the biforked element 7, the side surface of the silencer unit 24a and the side surface of the rear cover 18. The engaged condition of the cover 28 and the silencer unit 24a of the air cleaner is illustrated in FIG. 4 as a partial sectional view.

It should be understood by persons in the art of this field that this invention is not limited to the described embodiment and other various modifications and changes may be made without departing the nature or scope of the appended claims. For example, the shape of the biforked element 7, i.e. two portions constituting the same, of the main frame may be variously designed so as to meet with the configuration of the helmet storage box 20. Moreover, the helmet storage box 20 may be itself modified so that other materials can be accommodated therein if the interior thereof has an extra space.

What is claimed is:

1. A two-wheeled motorized vehicle comprising:
   a main frame having a biforked element comprised of two frame elements extending rearwardly and downwardly along the vehicle;
   a steerable front wheel rotatably supported at a front part of the main frame;
   a rear wheel rotatably supported at a rear part of the main frame;
   an internal combustion engine carried by the main frame and connected to rotationally drive the rear wheel;
   a storage compartment disposed above the engine in the space between the two rearwardly and downwardly extending frame elements and having a size and shape sufficient to store therein a helmet for a rider;
   a seat carried by the main frame and positioned rearwardly of the storage compartment, the seat having a bottom portion extending obliquely upwardly and rearwardly; and
   a fuel tank disposed substantially between the seat and the rear wheel so as to extend obliquely upwardly and rearwardly along the bottom portion of the seat, said fuel tank having a front end portion extending towards a lower side of a rear portion of the storage compartment and having a fuel port opened upwardly at a rear end portion of the fuel tank and at a rearward portion of the seat.

2. A two-wheeled motorized vehicle according to claim 1, wherein said fuel port is disposed at a portion of the fuel tank rearward of a front end of the rear wheel and above an upper end of the rear wheel.

3. A two-wheeled motorized vehicle according to claim 2, wherein said fuel port is covered by the seat.

4. A two-wheeled motorized vehicle according to claim 1, further including a rear frame connected to the main frame so as to rearwardly extend upwardly obliquely, said rear frame supporting the seat and being covered by a rear cover.

5. A two-wheeled motorized vehicle according to claim 4, wherein the fuel tank has two opposed sides, and said rear cover extends downwardly and covers the two sides of the fuel tank.

6. A two-wheeled motorized vehicle according to claim 1, wherein said fuel tank is made of a synthetic resin.

7. A two-wheeled motorized vehicle according to claim 1, further comprising an air cleaner having a part located below the storage compartment and another part located in a space between the storage compartment and the seat.

8. A two-wheeled motorized vehicle according to claim 7, wherein a front end of the fuel tank extends below said another part of the air cleaner.

9. A two-wheeled motorized vehicle according to claim 8, wherein the main frame is provided with a rear lower portion to which a front end of a mono-suspension is pivoted, and a part of the front end of the fuel tank is positioned above the front end of the mono-suspension mechanism.

* * * * *